United States Patent [19]
Yamauchi et al.

[11] Patent Number: 5,302,270
[45] Date of Patent: Apr. 12, 1994

[54] OXYGEN CONCENTRATION OR HUMIDITY CONTROLLING APPARATUS

[75] Inventors: Shiro Yamauchi; Takeo Yoshioka; Kenro Mitsuda; Toshiaki Murahashi, all of Amagasaki, Japan

[73] Assignee: Mitsubishi Denki Kabushiki Kaisha, Tokyo, Japan

[21] Appl. No.: 30,886

[22] Filed: Mar. 12, 1993

[30] Foreign Application Priority Data

| Mar. 12, 1992 | [JP] | Japan | 4-053224 |
| Jun. 22, 1992 | [JP] | Japan | 4-162566 |
| Aug. 5, 1992 | [JP] | Japan | 4-208908 |

[51] Int. Cl.⁵ .................................. C25B 9/00
[52] U.S. Cl. ............................. 204/265; 204/252; 204/266; 204/426
[58] Field of Search ............... 204/252, 249, 265, 266, 204/406, 421, 426, 435

[56] References Cited

U.S. PATENT DOCUMENTS

5,059,291  10/1991  Yamauchi et al.
5,096,549  3/1992  Yamauchi et al. ............ 204/295
5,118,261  6/1992  Yamauchi et al. ............ 204/421

FOREIGN PATENT DOCUMENTS

1-114745  5/1989  Japan ............ 204/421

Primary Examiner—Kathryn Gorgos
Attorney, Agent, or Firm—Oblon, Spivak, McClelland, Maier & Neustadt

[57] ABSTRACT

An oxygen concentration controlling element where the shortest distance between the anode and cathode separated by a solid electrolyte film is set not larger than 50 μm, thereby to accelerate the back-diffusion of water generated in the cathode to the anode and dispense with a tank or a pump for supplying water to the anode. An oxygen concentration or humidity controlling apparatus where a photoelectric element is disposed at an opening of a to-be-controlled space to the atmospheric air and the electric energy from the photoelectric element is accumulated in a secondary battery, thus realizing space-saving apparatus which can operate continuously though the power is turned off, and a humidity controlling apparatus functioning both as a humidifier and as a dehumidifier.

9 Claims, 9 Drawing Sheets

OXYGEN CONCENTRATION OR HUMIDITY CONTROLLING APPARATUS

BACKGROUND OF THE INVENTION

1. Field of the Invention

This invention relates to an oxygen concentration controlling apparatus for adjusting the oxygen concentration in an elevator, a vegetable compartment of a refrigerator or the like, and a humidity controlling apparatus for controlling humidities in a sealed vessel.

2. Description of the Related Art

FIG. 1 is a structural diagram of an electrochemical oxygen concentration controller disclosed, for instance, in the Japanese Patent Publication No. 2-44764 (1990). In FIG. 1, references 1-13 represent the follows, respectively; 1 an anode, 2 a cathode, 3 a solid polymer electrolyte film, 4a, 4b collectors, 5 an oxygen enriched chamber, 6 an oxygen deficient chamber, 7 a gas inlet to the oxygen enriched chamber 5, 8 a gas output from the oxygen enriched chamber 5, 9 a gas inlet to the oxygen deficient chamber 6, 10 a gas output from the oxygen deficient chamber 6, 11 a generative water tank, 12 a supply water tank and 13 a pump. The word "oxygen deficient" referred to above means to reduce the oxygen concentration in a gas. To the contrary, the word "oxygen enriched" stands for increasing of the oxygen concentration in a gas. NAFION-117 a copolymeric perfluorocarbon with ion exchange groups (trade name of E. I. du Pont de Nemours and Co.) is used for the solid polymer electrolyte film 3. The nominal thickness of the solid polymer electrolyte film 3 is 7 mil, i.e., approximately 170 μm, and the shortest distance between the anode and cathode is 150 μm or so.

The above electrochemical oxygen concentration controller operates in a manner as follows.

The water is electrolyzed by the external power in the anode 1, whereby a reaction according to a formula (1) takes place, thus increasing the oxygen concentration in the oxygen enriched chamber 5.

$$2H_2O \rightarrow O_2 + 4H^+ + 4e^- \quad (1)$$

Protons ($H^{30}$) and electrons ($e^-$) generated at this time are, respectively through the solid polymer electrolyte film and the external circuit, brought to the cathode, and consume the oxygen in the reaction according to a formula (2). As a result, the oxygen concentration in the oxygen deficient chamber 6 lowers.

$$O_2 + 4H^+ + 4e^- \rightarrow 2H_2O \quad (2)$$

The water of average three molecules or so is moved from the anode to the cathode along with the protons ($H^+$). The excessive water is, together with the water generated in the reaction of the formula (2), further transferred to the cathode from the anode. Meanwhile, the anode requires water, and therefore it is necessary to transfer the water to the water supply tank 12 by the pump 13.

The above electrochemical oxygen concentration controller of FIG. 1 utilizing the oxygen deficient chamber is applied to a storehouse of vegetables and fruits or a vegetable compartment of a refrigerator, as revealed in the Japanese Patent Publication No. 55-25343 (1980).

On the other hand, an air conditioner is an example of the electrochemical oxygen concentration controller of a type using the oxygen enriched chamber to increase the oxygen concentration inside hospital rooms or the like.

As depicted before, the conventional electrochemical oxygen concentration controller needs two tanks, that is, the generative water tank 11 and the water supply tank 12, and moreover it necessitates to transfer water by means of the pump 13.

FIG. 2 is a cross section showing the structure of a conventional oxygen concentration controlling apparatus disclosed, for example, in the Japanese Patent Publication No. 63-52119 (1988). Referring to FIG. 2, an oxygen concentration controlling element 60 is hermetically disposed inside an insulating frame 50 and consists of a diaphragm 3 made of a proton conductive solid and first and second porous electrodes 1, 2 arranged at the surfaces of the diaphragm 3. First and second reaction chambers 5, 6 provided with first and second collectors 4a, 4b, respectively, are separated from each other by the oxygen concentration controlling element 60 in the frame 50. A voltage is added to the first and second collectors 4a, 4b from a direct current supply 14. At this time, the first collector 4a is charged positively. A supply tube 17 couples the second reaction chamber 6 with the atmospheric air. A first water tank 11 having a first communication port 11a in the lower part, a first discharge tube 11b at the ceiling and a first suction port 11c in the upper part, stores the water in a manner to leave a gas layer in the upper part. Similarly, a second water tank 12 provided with a second communication port 12a in the lower part, a water supply port 12d at the bottom, a second discharge tube 12b at the ceiling and a second suction port 12c in the upper part stores the water, with a gas layer remaining in the upper part. The first communication port 11a of the first water tank 11 is connected to the second communication port 12a of the second water tank 12 by a communication tube 22, and the second reaction chamber 6 is connected to the first suction port 11c of the first water tank 11 by a first suction tube 23. The first reaction chamber 5 is connected with the water supply port 12d of the second water tank 12 by a water supply tube 24, while the first reaction chamber 5 is connected with the second suction port 12c of the second water tank 12 by a second suction tube 25.

When operating the conventional oxygen concentration controlling apparatus in the above-discussed structure, first, the water is stored in the first and second water tanks 11, 12. The water level in the water tanks 11, 12 are held the same because the tanks 11, 12 communicate with each other via the communication tube 22. Subsequently, the water is supplied from the second water tank 12 to the first reaction chamber 5 through the water supply tube 24. On the other hand, to the second reaction chamber 6 is fed the oxygen through the supply tube 17 from outside. In this state, a voltage is impressed to the first and second collectors 4a, 4b from the direct current supply 14 as to charge the first collector 4a positively. Accordingly, the following reaction takes place at the interface between the first porous electrode 1 which is charged positively by the impressed voltage and the diaphragm 3 made of the proton conductive solid;

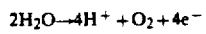

$$2H_2O \rightarrow 4H^+ + O_2 + 4e^-$$

As a result of the reaction, the water supplied to the first reaction chamber 5 is electrolyzed to produce the oxygen. The produced oxygen passes through the second suction tube 25 to the second water tank 12 together with the water left without reacting. As the oxygen and water are separated in the second water tank 12, only the water is stored in the second water tank 12, and the oxygen is discharged from the second discharge tube 12b to be fed to the atmosphere which is necessary to be enriched as in an elevator, etc.

The hydrogen ions generated in the above reaction move through the diaphragm 3 toward the negatively charged second porous electrode 2. When the hydrogen ions reach the second porous electrode 2, it brings about the following reaction at the interface between the second porous electrode 2 and the diaphragm 3 of a proton conductive solid;

$$4H^+ + O_2 + 4e^- \rightarrow 2H_2O$$

or $$2H^+ + 2e^- \rightarrow H_2$$

In consequence, the hydrogen ions and the oxygen supplied from the atmospheric air to the second reaction chamber 6 are electrolyzed to form water or hydrogen. The water or hydrogen, together with the atmospheric air with the oxygen consumed in the above reaction, passes through the first suction tube 23 into the first water tank 11, where it is separated to gas and liquid. Only the water is stored within the first water tank 11, while remaining gas is discharged through the first discharge tube 11b and fed to the ambience, for example, a vegetable compartment of a refrigerator where the oxygen concentration is to be controlled.

Because of the above constitution of the conventional oxygen concentration controlling apparatus, separate direct current supply 14 and first and second water tanks 11, 12 are required to be provided separately, thus making the apparatus bulky and space-wasting. It is also disadvantageous that the oxygen concentration controlling apparatus is unable to operate if the direct current supply 14 is stopped due to some failure.

FIG. 3 is a cross section of a conventional humidity controlling apparatus disclosed, e.g., in the Japanese Patent Application Laid-Open No. 62-277126 (1987). In the drawing, a humidity controlling element 103 is constituted of first and second porous electrodes 105, 106 divided by a diaphragm 104 made of a proton conductive solid, and hermetically and rigidly circumscribed by a frame 107 made of an insulating member. The frame 107 is fixedly secured in the periphery thereof in the airtight state to an opening 102 of a sealed vessel 101 in a manner as the second porous electrode 106 of the humidity controlling element 103 is directed outside. A direct current supply 108 applies a voltage to the first and second porous electrodes 105, 106 via a lead wire 109, charging the first porous electrode 105 positively.

The operation of the above humidity controlling apparatus will be depicted now. The moisture contained in a gas in the sealed vessel 101 accompanies a reaction as follows at the interface between the first porous electrode 105 positively charged by the voltage from the direct current supply 108 and the diaphragm 104 of a proton conductive solids;

$$H_2O \rightarrow 2H^+ + 1/2O_2 + 2e^-$$

The moisture contained in the gas of the container 101 is electrolyzed through the reaction and the oxygen molecules remain in the sealed vessel 101. The resultant hydrogen ions move towards the negatively charged second porous electrode 106 through the diaphragm 104. Then, the hydrogen ions reaching the second porous electrode 106 react at the interface between the second porous electrode 106 and the diaphragm 104 according to the following formula;

$$2H^+ + 1/2O_2 + 2e^- \rightarrow H_2O$$

or $$2H^+ + 2e^- \rightarrow H_2$$

As a result of this reaction, the hydrogen ions produce water or hydrogen which is in turn discharged to the space in touch with the second porous electrode 106. Accordingly, the humidity in the sealed vessel 101 is removed.

In the prior art, the direct current supply 108 should be provided separately from the above humidity controlling apparatus, therefore, requiring an additional space therefor. If the direct current supply 108 is troubled and stopped, the humidity controlling apparatus cannot work. Moreover, since the current is supplied only in one direction by the direct current supply 108, the apparatus functions only as a dehumidifier.

SUMMARY OF THE INVENTION

This invention has been devised to solve the above-described disadvantages inherent in the prior arts, and has for its first object to provide an oxygen concentration controlling apparatus which requires no generative water tank, no water supply tank and no pump, thus saving space, and an oxygen concentration or humidity controlling apparatus capable of continuously operating even if the power supply is stopped because of a fault, etc.

A second object of this invention is to provide a humidity controlling apparatus serving both as a dehumidifier and as a humidifier.

The above and further objects and features of the invention will more fully be apparent from the following detailed description with accompanying drawings.

DESCRIPTION OF THE PREFERRED EMBODIMENTS

An electrochemical oxygen concentration controlling apparatus using a solid polymer electrolyte film (referred to as an oxygen concentration controller hereinafter) and a humidity controlling apparatus according to this invention will be discussed hereinafter.

EMBODIMENT 1

Figure 1:
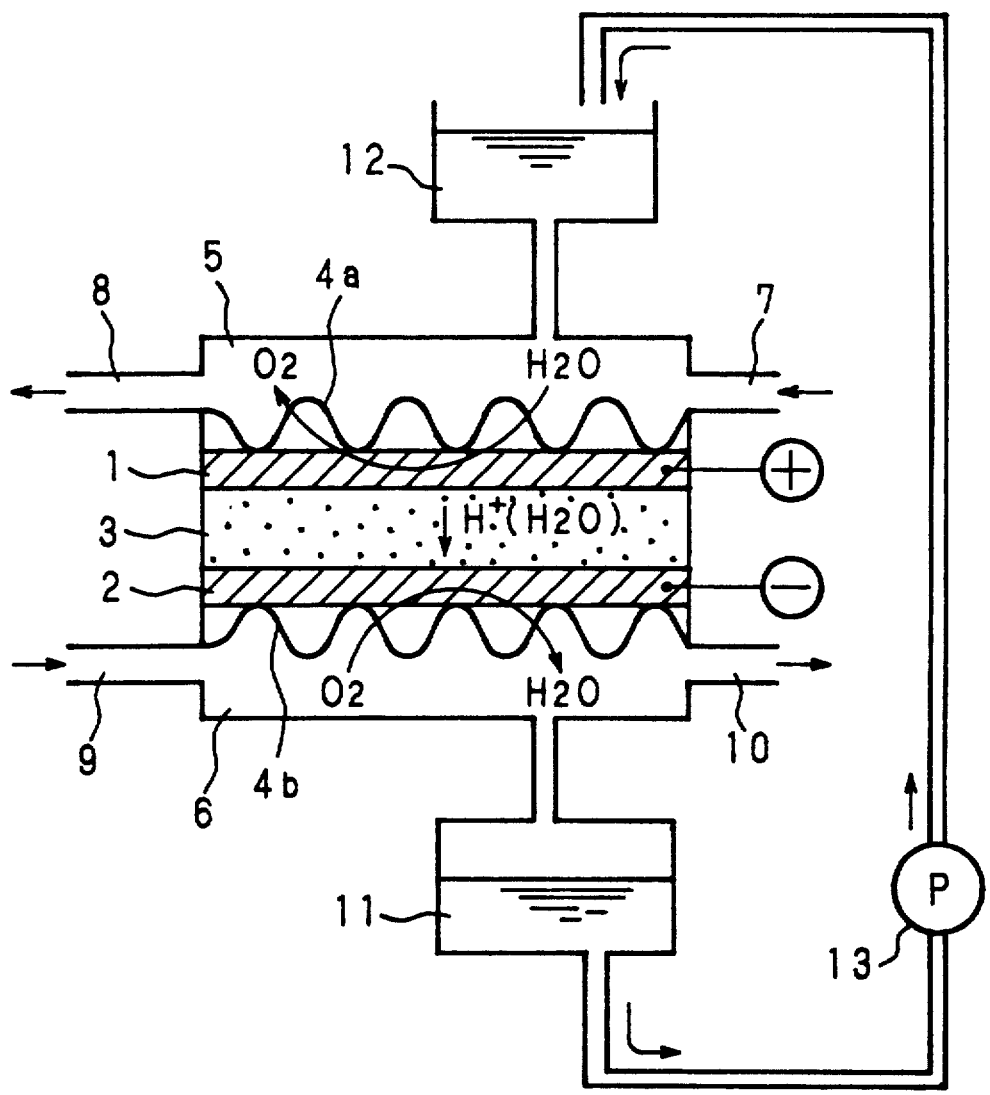
FIG. 1 is a cross section of a conventional oxygen concentration controlling apparatus.
Figure 2:
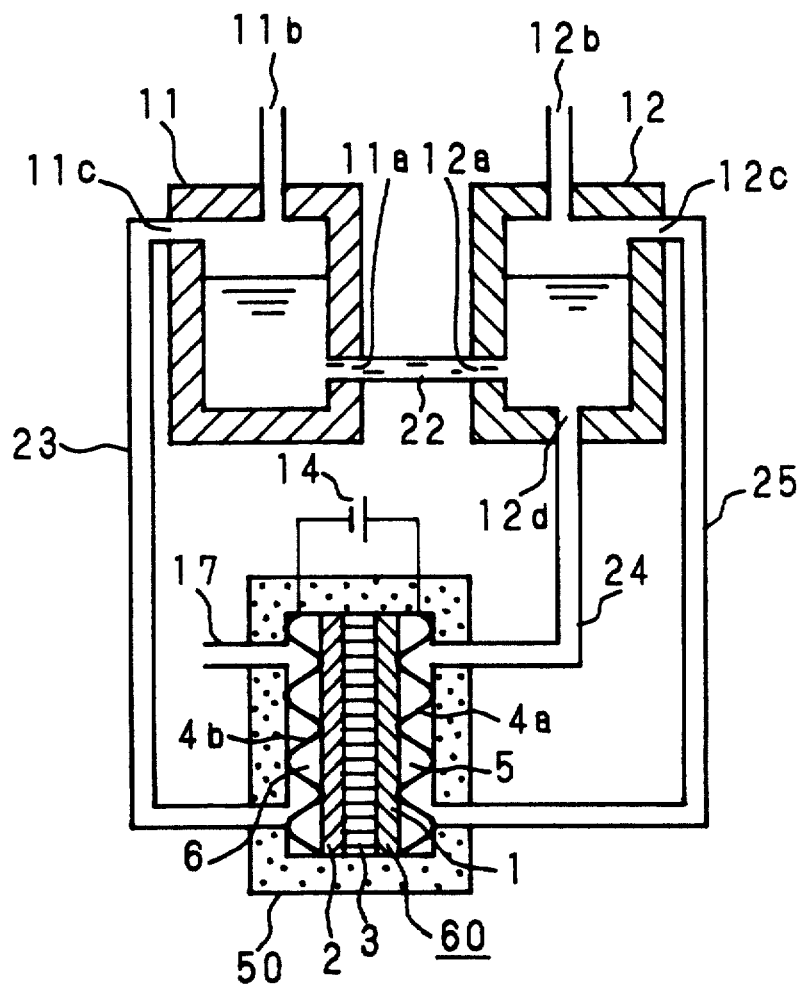
FIG. 2 is a cross section of another conventional oxygen concentration controlling apparatus.
Figure 3:
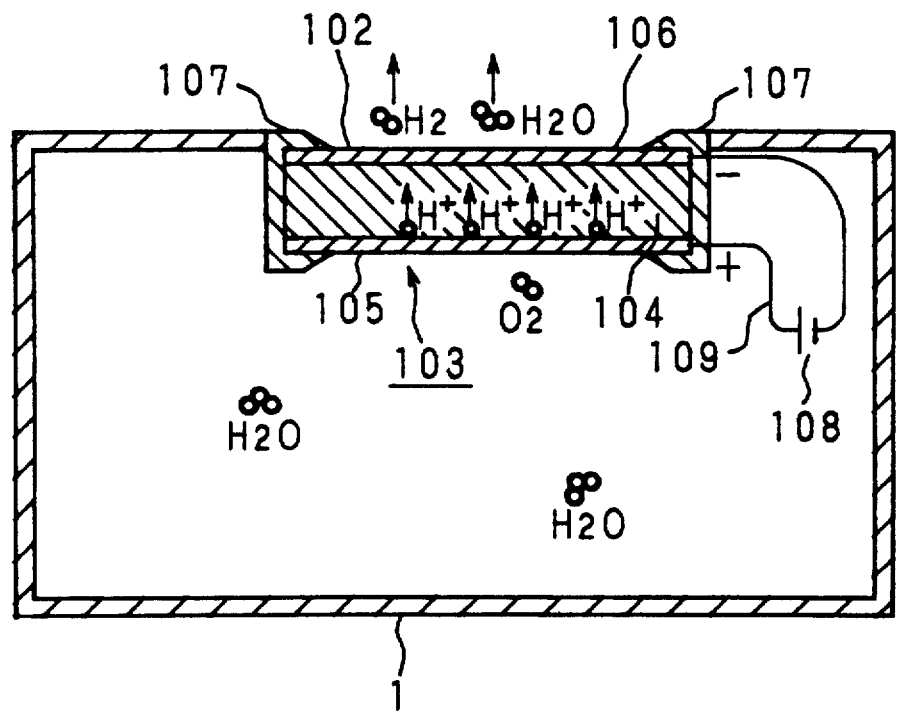
FIG. 3 is a cross section of a conventional humidity controlling apparatus.
Figure 4:
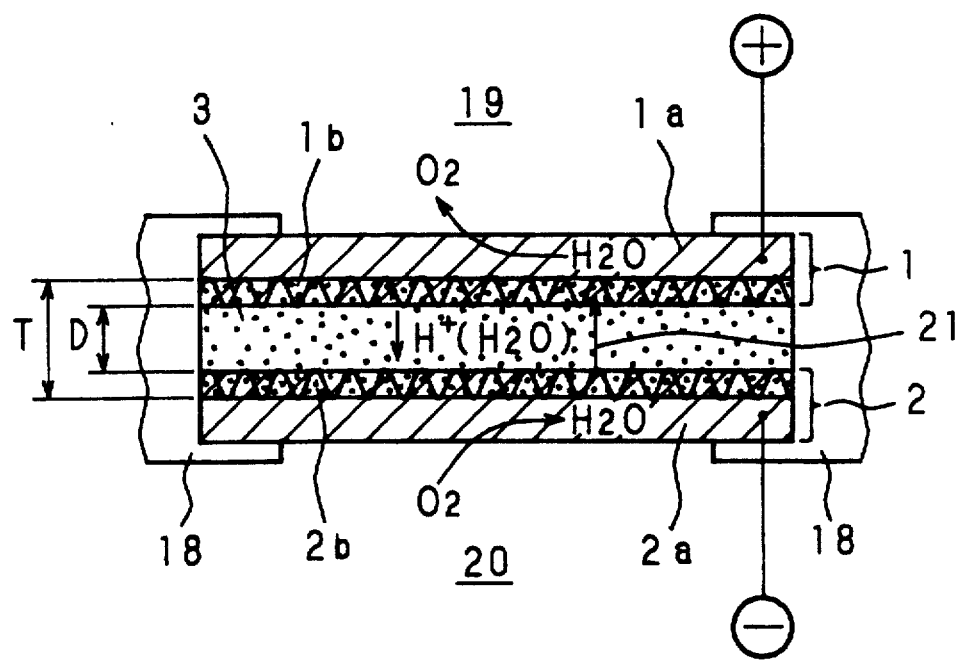
FIG. 4 is a cross section of an oxygen concentration controlling apparatus according to a first embodiment of this invention.

FIG. 4 is a cross section indicating the structure of an oxygen concentration controller according to an embodiment of this invention.

Referring to FIG. 4, an anode 1 for electrolyzing water thereby to generate oxygen comprises an anode base material 1a and an anode catalyst layer 1b. A cathode 2 which generates water thereby to consume oxygen is constituted of a cathode base material 2a and a cathode catalyst layer 2b. A solid polymer electrolyte film 3 is held between the anode 1 and the cathode 2. The anode base material 1a is formed of an expanded metal of Pt-plated titanium, and the cathode base material 2a is made of carbon fibers. Both base materials 1a and 2a are porous.

In FIG. 4, the solid polymer electrolyte film 3 thrusts into both the anode base material 1a and the cathode base material 2a as indicated by corrugated lines. The thrusting layers are the anode catalyst layer 1b and the cathode catalyst layer 2b of a platinum.

The shortest distance between the anode 1 and the cathode 2 is represented by D which is confirmed to be 30 μm through the sectional observation by a scanning electron microscope. The solid polymer electrolyte film 3 has a thickness T of about 130 μm and is made of NAFION-115 (trade name of E. I. du Pont de Nemours and Co.).

As mentioned above, the solid polymer electrolyte film 3 is arranged to thrust into the anode base material 1a and the cathode base material 2a by hot pressing at 190° C. with 50 kgf/cm². The anode catalyst layer 1b and the cathode catalyst layer 2b of the platinum catalyst where the reactions according to the foregoing formulas (1) and (2) take place scatters in three-dimensionally in the solid polymer electrolyte film 3 thrusting into the anode base material 1a and the cathode base material 2a.

An insulating resin 18 is exposed to both an oxygen enriched side 19 and an oxygen deficient side 20 with holding a composition of the coin-shape anode 1, cathode 2 and the solid polymer electrolyte film 3, which divides the both sides. An arrow 21 indicates a direction of the water back-diffusion from the cathode to the anode. It is to be noted here that the instant oxygen concentration controller is not provided with any generative water tank, supply water tank or pump at all.

Figure 5:
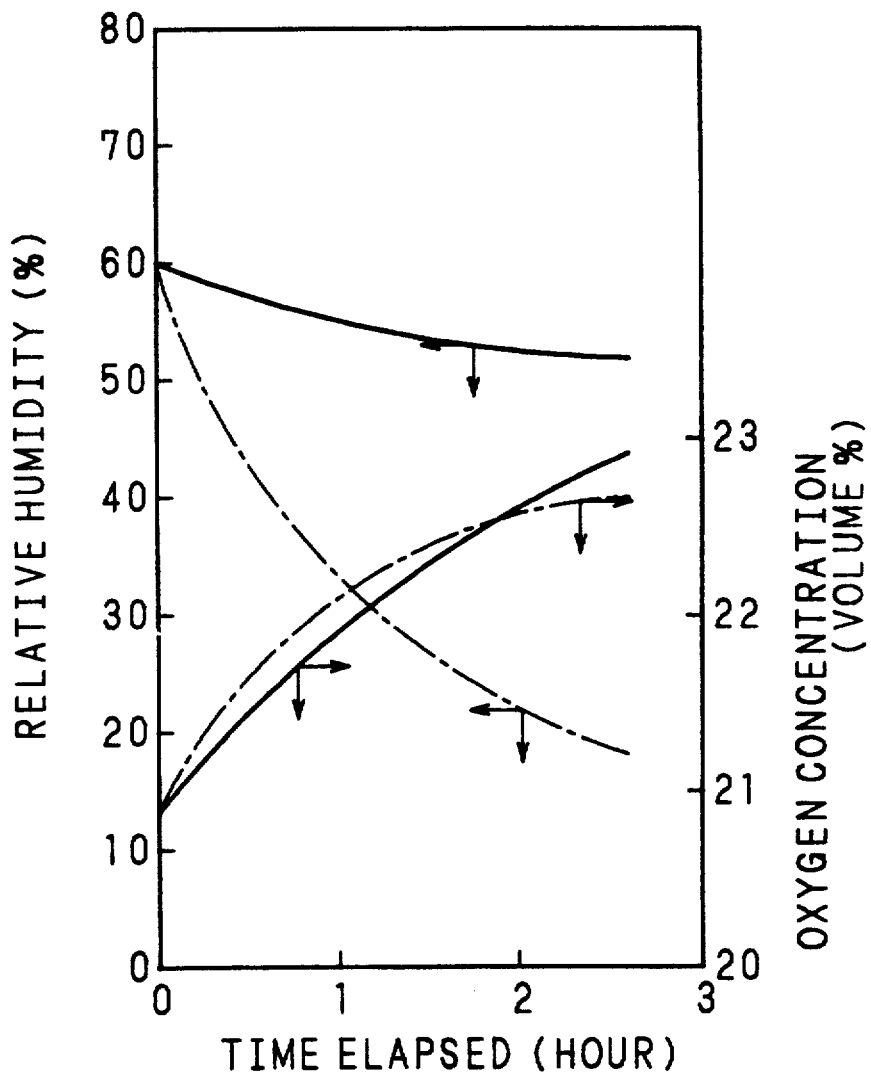
FIG. 5 is a graph indicating a change with the passage of time of the relative humidity and the oxygen concentration in the oxygen concentration controlling apparatus of FIG. 4.

The operation of the above oxygen concentration controller will now be described below. FIG. 5 is a graph showing a change with the passage of time of the relative humidity and the oxygen concentration in the oxygen concentration controller of FIG. 4 when a direct current of 2.5 V is applied between the anode 1 and the cathode 2 from an external direct current source to let a current flow while the oxygen enriched side 19 is kept airtight. In the graph, solid lines indicate the relative humidity and oxygen concentration by the oxygen concentration controller of this invention, and dashed lines represent comparative results by a conventional oxygen concentration controller using 170 μm thick NAFION-115 (trade name of E. I. du Pont de Nemours and Co.) with the shortest distance between the anode and the cathode being 150 μm. Although the oxygen concentration of the oxygen concentration controller of the invention with the shortest distance between the anode 1 and the cathode 2 being 30 μm rises to approximately the same level as the conventional controller, the relative humidity is less. That is because the oxygen enriched side 19 kept airtight has enough water owing to the large amount of the back-diffused water from the cathode 2 to the anode 1 indicated by the arrow 21 in FIG. 4. The reason for this large amount of the back-diffused water is supposed to be the shorter distance between the anode 1 and the cathode 2, where water is back-diffused more easily due to the concentration difference of water between the cathode 2 and the anode 1, so that the water in the cathode 2 returns to the anode 1 more quickly than the water evaporates from the anode 1.

In the meantime, since the oxygen has smaller solubility to water, the diffusing amount of oxygen from the oxygen enriched side 19 to the oxygen deficient side 20 is little so long as the solid polymer electrolyte film 3 contains moisture even if the distance between the anode 1 and the cathode 2 shortens. The diffusing amount is hardly influenced by the short distance between the anode 1 and the cathode 2, as is shown by the solid line in FIG. 5. In other words, the amount of the back-diffusing water increases remarkably by shortening the distance between the anode and the cathode, without transporting water from the cathode to the anode by the pump as in the conventional oxygen concentration controlling apparatus. As is also clear from the graph of FIG. 5, the oxygen concentration controllability is not lost even when the distance between the anode and cathode shortens.

After the same experiment is conducted for the oxygen deficient side 20 so as to render the oxygen deficient side 20 airtight, the oxygen concentration controllability is confirmed.

If the distance D between the anode 1 and the cathode 2 is made considerably smaller than the thickness T of the solid polymer electrolyte film 3, a longer diffusion distance of oxygen can be secured than the back-diffusion distance of water, and moreover, the evaporation of water to the oxygen deficient side 20 from the cathode 2 is restricted. Accordingly, the water returns from the cathode 2 to the anode 1 more, thereby reliably preventing the diffusion of oxygen to the cathode 2.

Figure 6:
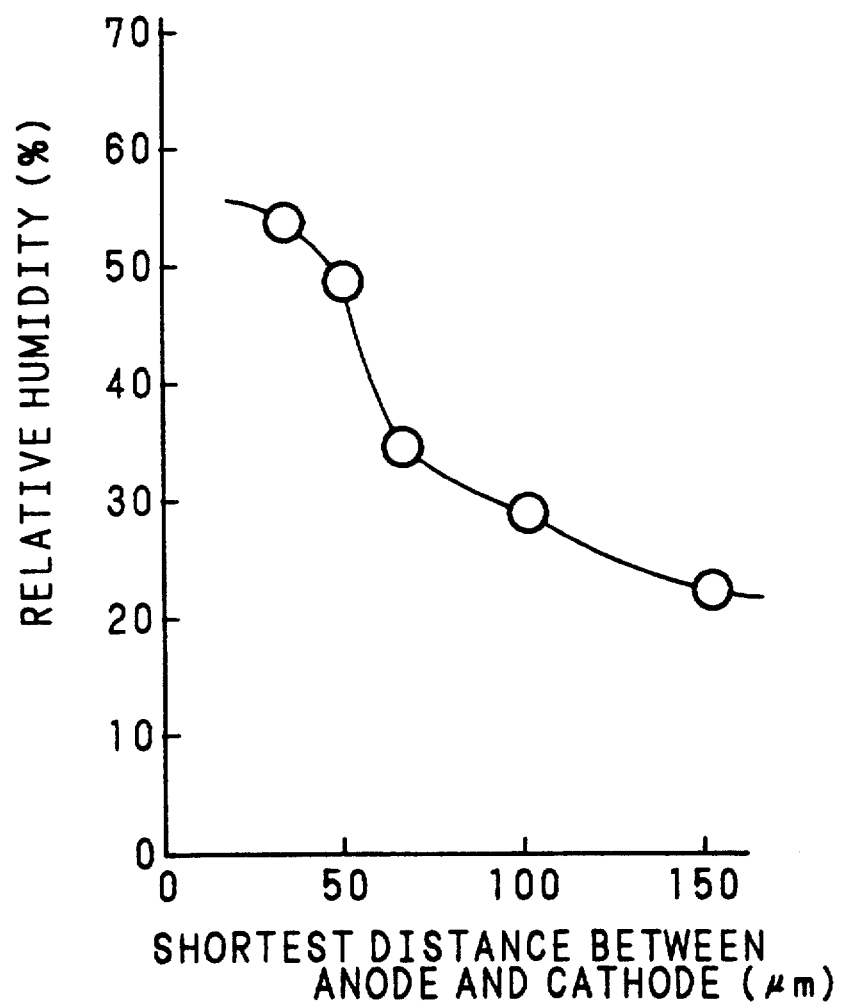
FIG. 6 is a graph showing the relationship between the shortest distance between an anode and a cathode, and the relative humidity in the oxygen concentration controlling apparatus of FIG. 4.

FIG. 6 shows the relationship between the shortest distance of the anode 1 and the cathode 2, and the amount of the back-diffusion of water in the oxygen concentration controller of this invention.

In this case, the thickness of the solid polymer electrolyte film 3, and the condition of hot pressing of thrusting the anode base material 1a and the cathode base material 2a into the film 3 are varied so as to vary the shortest distance between the anode 1 and the cathode 2.

NAFION-117 (trade name of E. I. du Pont de Nemours and Co.) of approximately 170 μm thick, is used for the solid polymer electrolyte film 3. The hot pressing of the anode 1 and the cathode 2 is carried out at 190° C. with a bearing stress of 50 kgf/cm² for three minutes, where the thrusting depth is controlled by means of a spacer of a constant thickness.

In the case of FIG. 6, the other conditions are kept same as in the case of FIG. 5, except that the relative humidity is plotted after a predetermined time has passed.

As is understood from the graph of FIG. 6, the relative humidity is higher according to this invention in which the shortest distance of the anode and the cathode is not greater than 50 μm. This means that the consuming amount of water at the side of the anode decreases, which is presumed to occur from the increase of the amount of the back-diffusion of water from the cathode to the anode.

According to this invention, it is necessary only that the solid polymer electrolyte film is held between the anode and the cathode, but is unnecessary that the anode and the cathode thrust into the solid polymer electrolyte film as in the foregoing embodiment. It is enough that the shortest distance between the anode and the cathode is not larger than 50 μm, favorably 20-50 μm, where the amount of the back-diffusion of water is large, thereby preventing the diffusion of oxygen from the cathode to the anode. In this case, the thickness of the solid polymer electrolyte film can be 50 μm or thinner.

The amount of the back-diffusion of water increases as in the above embodiment even if the solid polymer electrolyte film is of 50 μm thick or more, so long as at least one of the anode and the cathode has the porous base material thrusting into the solid polymer electrolyte film to make the shortest distance not greater than 50 μm. Moreover, it is not necessarily required that both the anode base material and the cathode base material thrust into the solid polymer electrolyte film as in the above-described embodiment.

If at least one of the anode and cathode has a porous base material thrusting into the solid polymer electrolyte film in the oxygen concentration controller of this invention, the diffusion of oxygen from the cathode to the anode is more effectively prevented.

Although the kind of the electrode base material is not strictly limited so long as it is an electrically conductive porous material with corrosion resistance, generally-used stainless steel fibers, platinum-plated stainless steel fibers, etc. besides the porous expanded metal may be used as the anode base material, and stainless steel fibers or nickel fibers may be employed as well for the cathode base material.

As the solid polymer electrolyte film, a metal that conducts protons, in addition to NAFION-117, NAFION-115 (trade names of E. I. du Pont de Nemours and Co.) referred to above, XUS-13.204.10 (trade name of Dow Chemical Co.) or the like which is generally used for the solid polymer electrolyte film can be employed.

Moreover, the size and the shape of the oxygen concentration controller of the invention are not particularly restricted, but the controller may be bent in order to be compact in structure so long as the controller is constituted of the anode, the cathode and the solid polymer electrolyte film held therebetween.

Although the controllability of the controller which differs depending on the size thereof and cannot be determined indiscriminately, if the area of the electrode is 100 cm², the generating amount of oxygen is 20-200 cc/min. and the deoxydation amount is 20-200 cc/min.

EMBODIMENT 2

Figure 7:
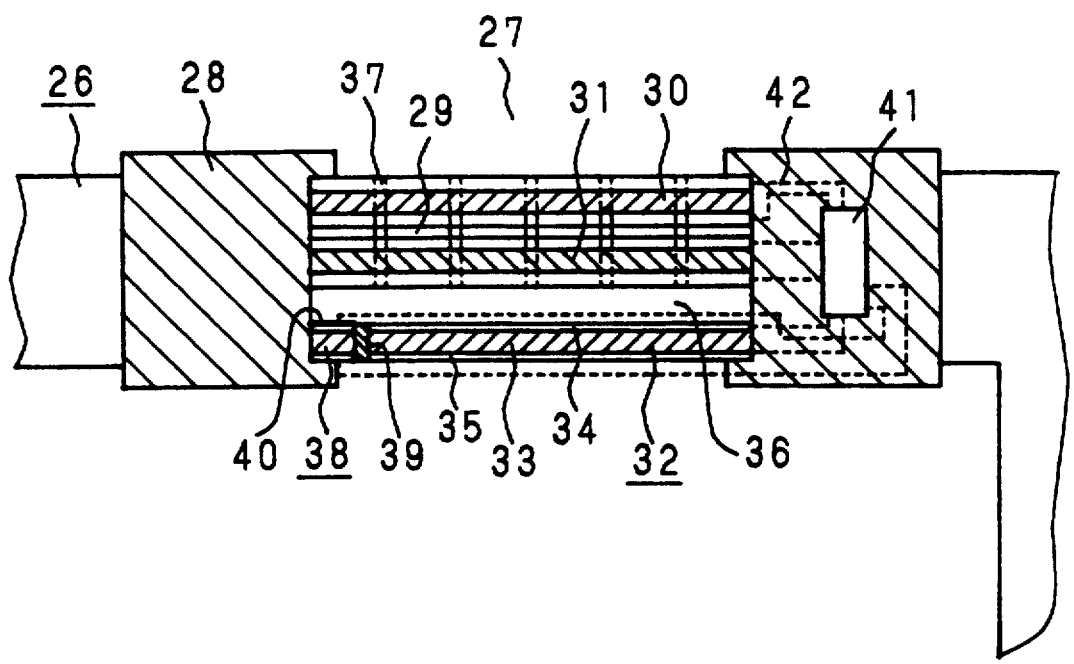
FIG. 7 is a cross section of an oxygen concentration controlling apparatus according to a second embodiment of this invention.

FIG. 7 is a cross section of an oxygen concentration controller according to a second embodiment of this invention. In the oxygen concentration controller in FIG. 7, a frame 28 is hermetically fixed in the periphery thereof to an opening 27 of an elevator 26. The frame 28 made of an insulating member has an opening in the center thereof. A photoelectric element 30, a substrate 29 and a secondary battery 31 are sequentially disposed from the outer side of the elevator 26 in a manner that the peripheries are hermetically fixed to the opening of the frame 28. An oxygen concentration controlling element 32 also hermetically fixed in the periphery to the opening of the frame 28 thereof and located inside the secondary battery 31 comprises a diaphragm 33 of a proton conductive solid, and first and second platinum porous electrodes 34, 35 provided at the both surfaces of the diaphragm 33 facing the inner and the outer sides of the elevator 26. A reaction chamber 36 defined by the secondary battery 31 and the oxygen concentration controlling element 32 communicates with the outside via a plurality of air passages 37 penetrating the secondary battery 31, substrate 29 and photoelectric element 30. An oxygen sensor 38 formed by sectioning a part of the oxygen concentration controlling element 32 with an insulating member 39, has a reference electrode 40 obtained by pressure-welding a KH₂PO₄ pellet to the sectioned part of the first porous electrode 34 on the reaction chamber 36 side. A controller 41 sealed inside the frame 28 charges the secondary battery 31 via a lead wire 42 with the electric energy generated by the photoelectric element 30, and at the same time supplies the electric energy to the oxygen concentration controlling element 32 in accordance with an output from the oxygen sensor 38.

The operation of the oxygen concentration controller of Embodiment 2 set in the elevator will be depicted below. The photoelectric element 30 converts the light energy into the electric energy, and the controller 41 charges the secondary battery 31 with the electric energy via the lead wire 42. Then, the oxygen sensor 38 outputs a signal corresponding to the oxygen concentration in the elevator 26 to the controller 41. In response to the output signal from the oxygen sensor 38, the controller 41 detects the oxygen concentration in the elevator 26 and supplies the electric energy obtained by the photoelectric element 30 to the oxygen concentration controlling element 32 in accordance with the detected oxygen concentration.

In the case where the oxygen concentration in the elevator 26 is deficient and required to be enriched, the controller 41 impresses such a voltage to the first and second porous electrodes 34, 35 that charge the second porous electrode 35 positively. Accordingly, the following reaction is brought about at the interface between the second porous electrode 35 and the diaphragm 33 made of a proton conductive solid in the oxygen concentration controlling element 32;

$$2H_2O \rightarrow 4H^+ + O_2 + 4e^-$$

Subsequent to the reaction, the moisture in the elevator 26 is electrolyzed to generate oxygen.

The hydrogen ions resulting from the above reaction move through the diaphragm 33 toward the first porous electrode 34 which is negatively charged. Thereafter, the hydrogen ions at the first porous electrode 34 react as follows at the interface between the first porous electrode 34 and the diaphragm 33 of a proton conductive solid;

$$4H^+ + O_2 + 4e^- \rightarrow 2H_2O$$

or $$2H^+ + 2e^- \rightarrow H_2$$

The hydrogen ions and the oxygen supplied from the atmospheric air through the air passage 37 into the reaction chamber 36 are electrolyzed, thereby producing water or hydrogen. The water or hydrogen is discharged outside the elevator 26 through the air passages 37. Consequently, the oxygen concentration in the elevator 26 increases to relieve the deficiency, so that the ambience in the elevator 26 is kept comfortable.

EMBODIMENT 3

Although Embodiment 2 refers to the ambience in the elevator 26 requiring enrichment of the oxygen concentration, this invention is applicable to the ambience, for example, in a vegetable compartment of a refrigerator where the oxygen concentration should be deficient. More specifically, the oxygen concentration decreases by an inverse reaction to the reaction in Embodiment 2, so that the intended ambience is obtained.

Further, this invention may be utilized also for a combustion chamber where the oxygen deficiency should be prevented or for a water tank where the oxygen concentration should be enriched, with the same effects.

Embodiment 3 is directed to the ambience in the vegetable compartment of a refrigerator, but is applicable also to the ambience requiring the oxygen concentration to be deficient such as a grain storehouse.

EMBODIMENT 4

Figure 8:
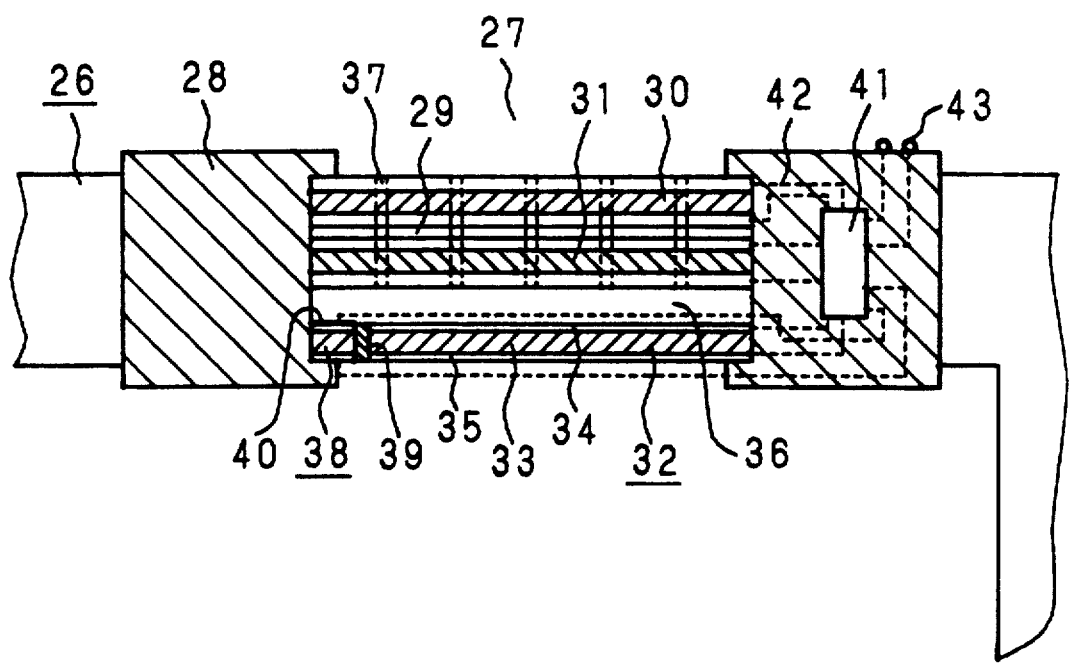
FIG. 8 is a cross section of an oxygen concentration controlling apparatus according to a fourth embodiment of this invention.

FIG. 8 is a cross section of an oxygen concentration controller according to a fourth embodiment of this invention. Since the parts denoted by references 26-42 in FIG. 8 are the same as in Embodiment 2, the description thereof will be abbreviated here. A terminal 43 is provided outside the frame 28 to make it possible to connect the controller 41 to the outside. If the surplus electric energy generated by the photoelectric element 30 exceeds the capacity of the secondary battery 31, the controller 41 can charge an external charging battery (not shown) with this surplus energy via the terminal 43, while the controller 41 can introduce the energy from the external battery to the oxygen concentration controlling element 32 in case of necessity. In the case where the photoelectric element 30 turns off and the electric energy charged in the secondary battery 31 is exhausted, the electric energy can be introduced from the external power source via the terminal 43 to the oxygen concentration controlling element 32, if necessary.

EMBODIMENT 5

Figure 9:
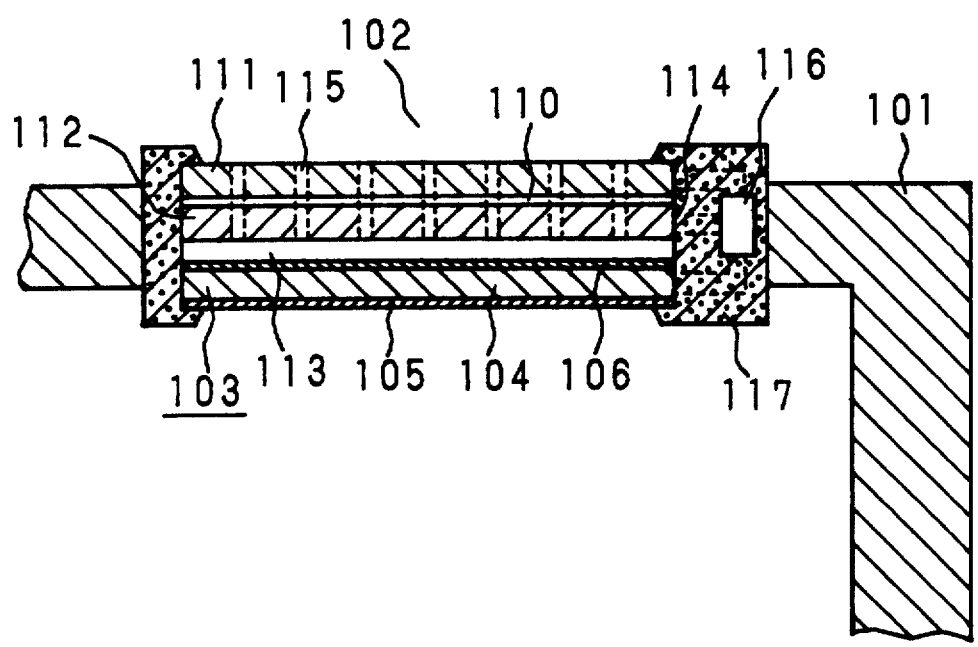
FIG. 9 is a cross section of a humidity controlling apparatus according to this invention.

FIG. 9 is a cross section of a humidity controlling apparatus according to this invention. Since the parts denoted by numerals 101-106 represent the same as in the conventional apparatus, they are designated by the same reference numerals and the thereof will be abbreviated. Reference numerals 111, 112 are a photoelectric element and a secondary battery respectively arranged on both surfaces of a substrate 110. A reaction chamber 113 is formed between the secondary battery 112 and the humidity controlling element 103. A frame 114 of an insulating member surrounds and hermetically fixes the sequentially-laminated photoelectric element 111, substrate 110, secondary battery 112, reaction chamber 113 and humidity controlling element 103. The periphery of the frame 114 is hermetically fixed to the opening 102 of the sealed vessel 101 with the photoelectric element 111 facing the outside. The reaction chamber 113 communicates with the atmospheric air via a plurality of air passages 115 penetrating the photoelectric element 111, substrate 110 and secondary battery 112. A controller 116 sealed in the frame 114 of the insulating charges the secondary battery 112 via a lead wire 117 with the electric energy produced by the photoelectric element 111 and controls the electric energy to be supplied to the humidity controlling element 103.

The humidity controlling apparatus according to the fifth embodiment of this invention in the above-described structure operates in a manner as will be discussed below. The photoelectric element 111 converts the light energy to the electric energy. The controller 116 charges the secondary battery 112 with the electric energy via the lead wire 117 and controls the electric energy supplied to the humidity controlling element 103. When dehumidifying the sealed vessel 101, the controller 116 applies such a voltage to the first and second porous electrodes 105, 106 as to electrify the first porous electrode 105 positively. Similar to the prior art, the following reaction takes place at the interface between the positively charged first porous electrode 105 and the diaphragm 104 made of a proton conductive solid in the humidity controlling element 103;

$$H_2O \rightarrow 2H^+ + 1/2O_2 + 2e^-$$

Accordingly, the moisture contained in a gas in the sealed vessel 101 is electrolyzed and the oxygen molecules in the above reaction formula are left in the sealed vessel 101. The electrolyzed hydrogen ions move through the proton conductive solid 104 to the negatively charged second porous electrode 106. The hydrogen ions bring about a reaction as follows at the interface between the second porous electrode 106 and the diaphragm 104;

$$2H^+ + 1/2O_2 + 2e^- \rightarrow H_2O$$

or $$2H^+ + 2e^- \rightarrow H_2$$

In consequence of the reaction, water or hydrogen is generated from the hydrogen ions, and discharged to the reaction chamber 113. The water or hydrogen is then discharged to the atmospheric air through the air passages 115. Accordingly, the sealed vessel 101 is dehumidified.

When humidifying the sealed vessel 101, the controller 116 impresses such a voltage as to charge the second porous electrode 106 positively to the first and second porous electrodes 105. The reaction in this case proceeds in an inverse direction to the reaction of the above dehumidification, whereby the water or hydrogen is discharged to the sealed vessel 101 and the gas in the vessel 101 is humidified. The humidifying/dehumidifying capacity is controlled by controlling a current to be supplied to the humidity controlling element 103 by the controller 116.

EMBODIMENT 6

Although in Embodiment 5, a material for the proton conductive solid constituting the diaphragm 104 was not referred to, when a proton conductive solid with hygroscopic such as NAFION-117 (trade name of E. I. du Pont de Nemours and Co.) is employed, the dehumidification starts promptly as soon as the power is supplied even if the power from the secondary battery 112 is impossible to be supplied, because the moisture once absorbed by the hygroscopic proton conductive solid is electrolyzed as soon as the power is supplied. Secondary battery 112 becomes impossible to be supplied. Therefore, dehumidification starts promptly after the power is supplied.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are, therefore, intended to be embraced by the claims.

What is claimed is:

1. An oxygen concentration controlling element comprising:
   a porous anode for electrolyzing water to generate oxygen;
   a porous cathode for generating water to consume oxygen; and
   a solid electrolyte film sandwiched between said anode and cathode,
   wherein said anode and cathode are arranged having a shortest distance of not larger than 50 $\mu$m thereby to back diffuse the water generated by said cathode to said anode.

2. An oxygen concentration controlling element according to claim 1, wherein at least either one of porous electrode base materials of said anode and cathode thrusts into said solid electrolyte film.

3. An oxygen concentration controlling apparatus comprising:
   a photoelectric element arranged at an opening to atmospheric air of a space where the oxygen concentration is to be controlled;
   a secondary battery for accumulating electric energy from said photoelectric element;
   a reaction chamber which takes in the atmospheric air for controlling the oxygen concentration, and discharges the reaction product by controlling the oxygen concentration of said space;
   an air passage penetrating said photoelectric element for communicating said reaction chamber with the atmospheric air;
   an oxygen concentration controlling element provided between said reaction chamber and space, and which includes a solid electrolyte film, and first and second porous electrodes respectively provided on the reaction chamber side and the space side of said solid electrolyte film wherein said first and second porous electrodes are arranged having a shortest distance of not larger than 50 $\mu$m;
   an oxygen sensor for detecting the oxygen concentration in said space; and
   a controller for charging said secondary battery with the electric energy from said photoelectric element, and supplying said electric energy to the first and second porous electrodes of said oxygen concentration controlling element in accordance with the oxygen concentration detected by said oxygen sensor, thereby to control the oxygen concentration of said space.

4. An oxygen concentration controlling apparatus according to claim 3, wherein said oxygen sensor has a reference electrode formed by sectioning a part of said oxygen concentration controlling element by an insulating member and pressure-welding a $KH_2.PO_4$ pellet to the sectioned part on the reaction chamber side.

5. An oxygen concentration controlling apparatus according to claim 3, further comprising:
   a terminal to connect said controller with the outside for outputting the electric energy generated by said photoelectric element to the outside or supplying the electric energy from outside to said oxygen concentration controlling element.

6. An oxygen concentration controlling apparatus according to claim 3, further comprising:
   a means for reversing polarities of said first and second porous electrodes.

7. A humidity controlling apparatus comprising:
   a photoelectric element arranged at an opening to atmospheric air of a space where the humidity is to be controlled;
   a secondary battery for accumulating electric energy generated from said photoelectric element;
   a reaction chamber which takes in the atmospheric air for controlling the humidity, and discharges the reaction product by controlling the humidity of said space;
   an air passage penetrating said photoelectric element for communicating said reaction chamber with the atmospheric air;
   a humidity controlling element provided between said reaction chamber and space, and which includes a solid electrolyte film, and first and second porous electrodes respectively provided on the reaction chamber side and the space side of said solid electrolyte film wherein said first and second porous electrodes are arranged having a distance of not larger than 50 $\mu$m; and
   a controller for charging said secondary battery with the electric energy from said photoelectric element, and controlling the amount of said electric energy supplied to said first and second porous electrodes of said humidity controlling element, thereby to control the humidity of said space.

8. A humidity controlling apparatus according to claim 7, wherein said solid electrolyte film is hygroscopic.

9. A humidity controller according to claim 7, wherein said controller further comprising:
   a means for reversing polarities of said first and second porous electrodes.

* * * * *